Sept. 17, 1963 L. C. NEUFELD 3,103,683
WINDSHIELD CLEARING SYSTEM
Filed May 20, 1960 3 Sheets-Sheet 1
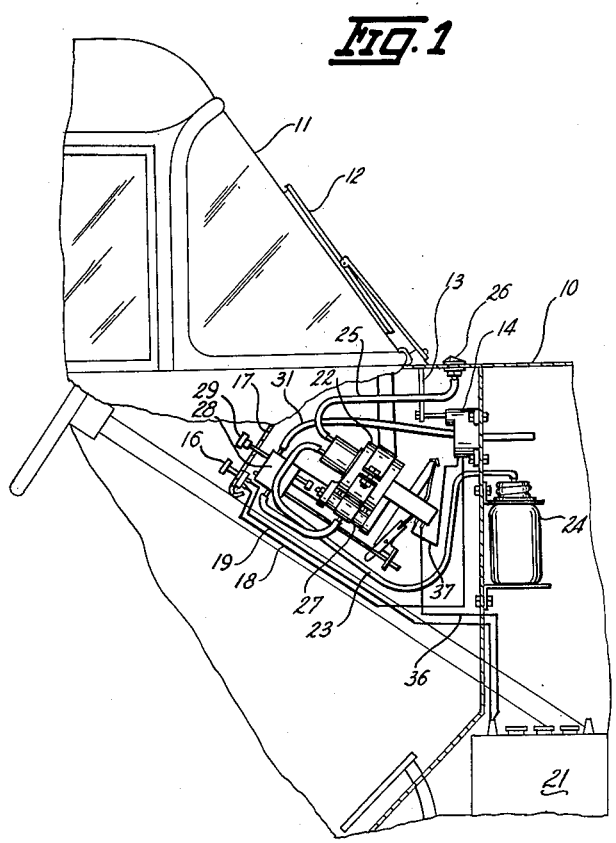
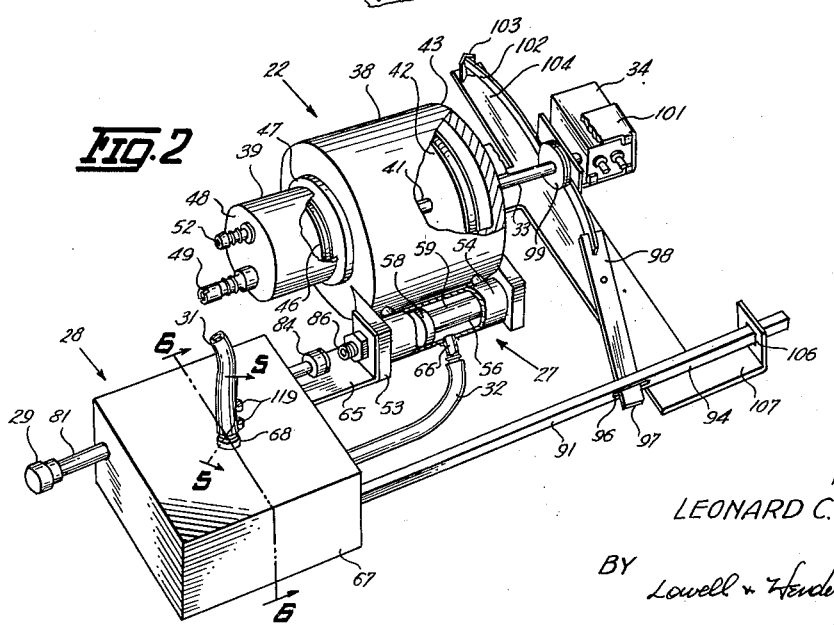
INVENTOR.
LEONARD C. NEUFELD
BY Lowell & Henderson
ATTORNEYS.

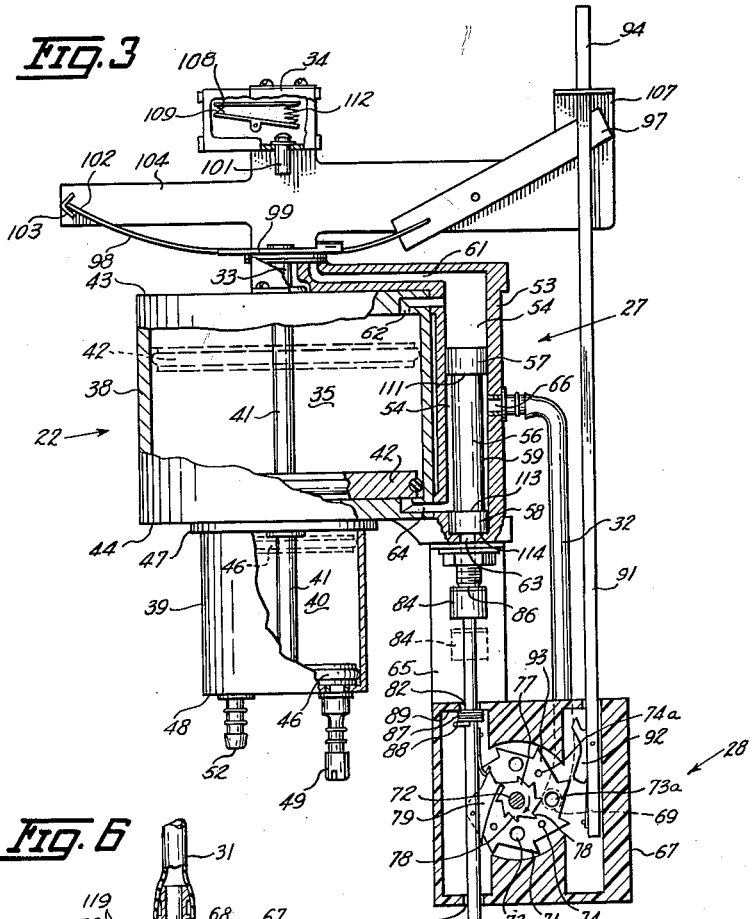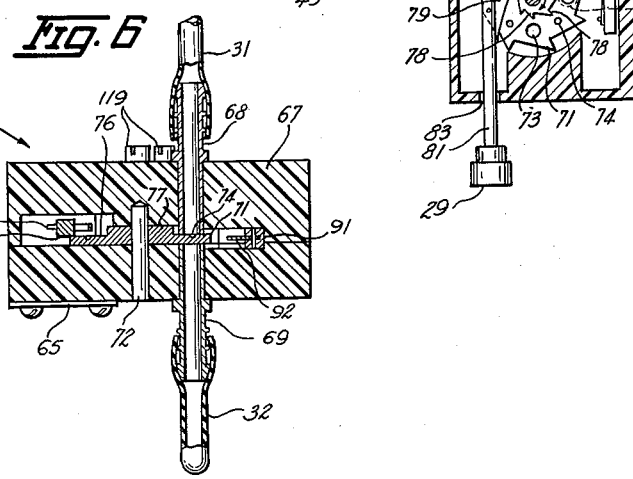

Sept. 17, 1963　　　L. C. NEUFELD　　　3,103,683
WINDSHIELD CLEARING SYSTEM
Filed May 20, 1960　　　　　　　　　　3 Sheets-Sheet 3
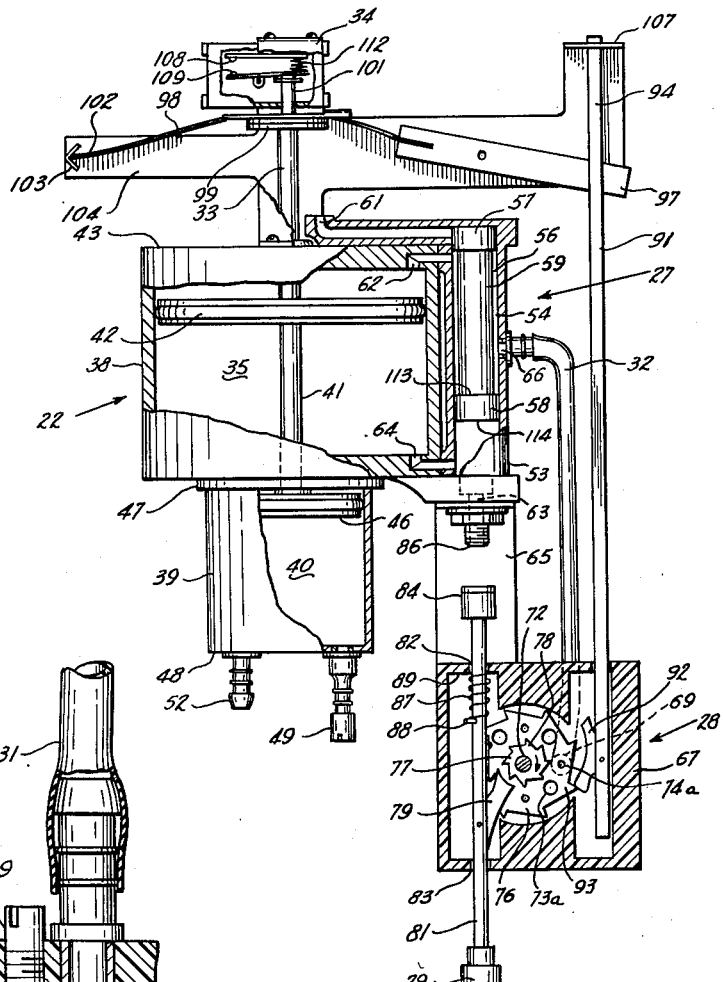
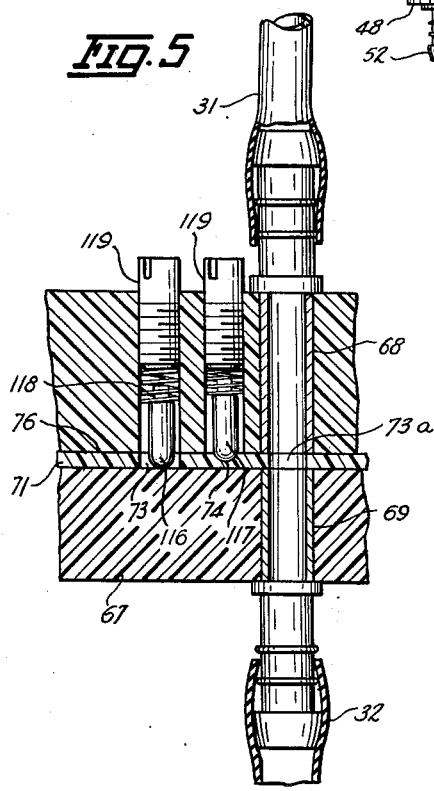
INVENTOR.
LEONARD C. NEUFELD
BY Lowell & Henderson
ATTORNEYS.

United States Patent Office 3,103,683
Patented Sept. 17, 1963

3,103,683
WINDSHIELD CLEARING SYSTEM
Leonard C. Neufeld, Des Moines, Iowa, assignor to The Delman Company, Cookeville, Tenn., a corporation of Tennessee
Filed May 20, 1960, Ser. No. 30,650
8 Claims. (Cl. 15—250.02)

This invention relates to a vehicular windshield clearing system and more particularly to a control device providing for the concurrent operation of the wiper and washer units and for a delayed stopping of the wiper unit relative to a stopping of the washer unit.

An object of this invention is to provide an improved control device for a windshield clearing system wherein the momentary depressing of a button by the vehicle operator first operates both wiper and washer units simultaneously, and secondly deactuates the wiper unit a predetermined period of time after the deactuation of the washer unit.

A further object of this invention is to provide an improved windshield clearing system having a pneumatically actuated pump for the washer unit which is positively recharged with fluid at the end of each washing cycle, thereby ensuring delivery of fluid onto the windshield simultaneous with commencement of each wiping operation.

Yet another object of this invention is to provide a coordinated control for a windshield wiper-washer clearing system embodying a pneumatically actuated valve for controlling the operation of the system, and which operation first starts the washer and wiper units simultaneously, and second stops the wiper unit subsequent to a stopping of the washer unit, the valve being actuated pneumatically by a momentary depression of a single push button.

It is another object of this invention to provide a windshield clearing system for a vehicle having a source of suction pressure, where the suction pressure is utilized to its fullest value in pneumatically operating a fluid delivery device to deliver a fluid onto a windshield simultaneous with the beginning of a wiping operation, and to deactuate the wiping operation a predetermined time after completion of the fluid delivery, and further where the suction pressure is used to actuate and position a control device for controlling the operation of the fluid delivery device.

Another object of this invention is to provide structure for attaining the above designated objectives which is economical to manufacture and effective in operation.

These objects and other features and advantages of this invention will become apparent by reference to the following description when taken in conjunction with the accompanying drawings, wherein:

FIG. 1 is a schematic representation of a motor vehicle equipped with a windshield clearing system constructed in accordance with the present invention;

FIG. 2 is an enlarged perspective view of the control device and associated parts of the system of FIG. 1, with some parts broken away for clarification;

FIG. 3 is an enlarged top plan view of the control device of FIG. 2, with some parts shown in section and others broken away for clarity of illustration, and wherein the device is shown in an operative position changed from the position of FIG. 2;

FIG. 4 is a view similar to FIG. 3, and showing the control device in another operative position;

FIG. 5 is an enlarged fragmentary sectional view taken along the line 5—5 in FIG. 2 and showing the positive locking structure for the inlet valve device; and FIG. 6 is an enlarged sectional view taken along the line 6—6 in FIG. 2 and showing the inlet valve device.

Referring now to the drawings, a motor vehicle is illustrated having a cowl 10 and a windshield 11 mounted thereon. A wiper unit comprises a wiper blade 12, a linkage 13, and an electric wiper motor 14. When it is desired to operate the wiper unit alone, the operator depresses a switch 16 mounted on the dashboard 17. This closes a circuit through leads 18 and 19, the grounded electric motor 14 and a grounded battery 21. The wiper will continue to oscillate until the switch 16 is again depressed, thus breaking the circuit.

The washer unit comprises a pneumatically actuated fluid delivery device 22 (FIG. 1) operable to withdraw fluid through a conduit 23 from a reservoir 24. The device 22 discharges the fluid through a conduit 25 to a nozzle 26 mounted on the cowl 10, from which the fluid is directed against the windshield 11 and into the path of the wiper 12. The washer unit includes further a pneumatically operated control valve device 27 (FIGS. 1 and 2) for controlling the operation of the fluid delivery device 22. The control valve device 27 includes a push button 29 mounted on the dashboard 17 for use by the operator to initiate operation of the washer unit. The inlet valve structure 28 is connected by a suction line 31 to the intake manifold system of the vehicle and by a line 32 to the control valve device 27 for applying suction pressure to the device 27. Mechanically connected by a piston rod extension 33 of the fluid delivery device 22, is a coordinator 34 in the form of an electric switch (FIG. 2) and which is interconnected by leads 36 and 37 to the battery 21 and the electric motor 14.

In accordance with the present invention, a momentary depression of the push button 29 closes off the control valve device 27 from the atmosphere. The control valve device 27 to which a suction pressure is applied through the line 32, is then pneumatically operated to actuate, by the application of pressure differentials, the fluid delivery device 22 to discharge fluid through the nozzle and against the windshield 11. With the operation of the fluid delivery device 22, the coordinator 34 is actuated to start the wiper motor 14 simultaneously with delivery of fluid. As will be seen hereinafter, upon a completion of the delivery of fluid, the coordinator 34 is operated to stop the wiper motor 14. Thus, the wiper blade 12 ceases oscillating a predetermined interval of time after the completion of the fluid delivery.

The fluid delivery device 22 (FIGS. 2 and 3) includes a fluid motor cylinder housing 38 and a pump housing 39 attached thereto. The housings are axially aligned for the utilization of a common piston rod 41 reciprocally mounted in both housings 38 and 39. Within the cylinder housing chamber 35, the rod 41 carries a piston 42 movable from adjacent the top 43 (FIG. 3) of the housing 38 to the bottom 34 thereof. In the pump housing chamber 40, the rod 41 carries a piston 46 also movable from the top 47 of the pump housing 39 to the bottom 48 of the housing 39. At the bottom 48 of the pump housing 39, a fluid inlet coupling 49 is provided for attachment to the conduit 23 (FIG. 1) leading to the reservoir 24, and a fluid outlet coupling 52 is provided for attachment to the conduit 25 leading to the nozzle 26. Conventional one way valves (not shown) are built into the inlet and outlet couplings for reversible operation in response to the pressure of the liquid in the pump housing chamber 40.

Integral with the fluid delivery cylinder housing 38 is a housing 53 (FIG. 3) for the control valve device 27, and within which a bore 54 is formed parallel to the longitudinal axis of the cylinder housing 38. A spool valve 56 is reciprocally mounted in the bore 54 and is provided with upper and lower lands 57 and 58, respectively, having diameters slightly less than the diameter of the bore 54. The lands 57 and 58 are connected by a shank 59 having a diameter less than the diameter of the bore 54 for a purpose hereinafter described. At the upper end of the valve housing 53, a port 61 (FIG. 3) is formed therein which opens the bore 54 to the atmosphere, and also a passage 62 is formed in the housings 53 and 38 to communicate the expansible area of cylinder housing chamber 38 above the piston 42 with the atmosphere, through the port 61.

At the lower end of the control valve housing 53, another port 63 is formed therein communicating the lower end of the bore 54 below the valve land 58 with the atmosphere, and also adjacent thereto is a passage 64 communicating the expansible area of the chamber 38 below the piston 42 with the atmosphere, through the port 63. Intermediate both sets of ports 61 and 63 and passages 62 and 64 is a port 66 formed in the control valve housing 53 and which is connected to the suction line 32 leading to the inlet valve structure 28, for the purpose of introducing a subatmospheric pressure about the shank 59 of the valve and between the lands 57 and 58.

The inlet valve structure 28 includes a housing 67 (FIG. 2) mounted on a bracket 65 secured to the control valve housing 53. Mounted in axial alignment in the housing 67 (FIGS. 3 and 6) is an inlet coupling 68 for connection to the intake manifold suction line 31, and an outlet coupling 69 for connection to the control valve line 32. At their inner ends, the couplings are separated by a ratchet wheel 71 rotatably mounted in the housing 67 on a pin 72 for movement in a direction normal to the axes of the couplings 68 and 69. The ratchet wheel 71 is provided about its periphery with a plurality of arcuately and equidistantly spaced openings 73 and depressions 74 (see FIG. 5), with the depressions 74 being formed in the face 76 of the wheel 71. The openings 73 and depressions 74 are alternately staggered for a purpose to appear hereinafter.

Also formed on the face 76 of the ratchet wheel 71 (FIG. 3) is a ratchet wheel 77 of a smaller diameter, and the teeth 78 of which are engageable by a spring biased pawl 79 pivotally mounted on an actuating rod portion 81 of the push button 29. The actuating rod 81 is reciprocally movable through aligned openings 82 and 83 formed in the housing 67 and has on the inner end thereof a closure member 84 adapted to be moved against and in a covering relation with the exposed end 86 of the atmospheric port 63. A coil spring 87 is mounted about the actuating rod 81 between a pin 88 on the rod and an internal wall 89 of the housing 67. Thus, upon a release of the push button 29, after it has been depressed by the operator, the spring 87 forces the push button and the rod 81 back to their original inoperative positions.

By virtue of the relation between the teeth 78 of the small ratchet wheel 77 and the openings 73 and depressions 74 of the larger ratchet wheel 71, inward, or upward movement as viewed in FIG. 3, of the push button rod 81 rotates an opening 73a into alignment with the inlet and outlet couplings 69 and 68 thereby opening the couplings and the suction lines 31 and 32 to each other. By this arrangement, it may readily be seen that such operative movement of the push button 29 provides for the application of suction pressure from the intake manifold system through the inlet valve structure 28 and the line 32 to the control valve device 27.

As linear movement of the push button rod 81 rotates the ratchet wheel 71 so as to place an opening 73a into alignment with the couplings 68 and 69, like movement of an elongated return rod 91 (FIGS. 2 and 3) rotates the wheel 71 to align a depression 74 with the couplings (FIG. 6) and thus close off the inlet suction line 31 from the outlet suction line 32. The return rod 91 is also provided with a pawl 92 pivotally mounted thereon, and spring biased to engage the teeth 93 of the ratchet wheel 71. A slot 96 at the upper end 94 of the return rod (FIG. 2) receives one end 97 of a spring valve 98 of the leaf spring type.

The spring valve 98 (FIGS. 2 and 3) is connected intermediate its ends to the piston rod extension 33 and is combined at that connection with a closure member 99. Due to reciprocal movement of the piston rod 41, the closure member 99 is movable between a position engageable with a pin 101, operable to open the coordinator switch 34, and a position closing off the upper port 61 for the control valve housing 53 (FIG. 3). The end 102 of the spring valve 98 opposite the end 97 is supported in frictional engagement with a V-shaped member 103 mounted on a bracket 104, which is secured to the upper end 43 of the cylinder housing 38, supports the coordinator 34, and includes an angular portion 107 having an opening 106 (FIG. 2) for guidably supporting the return rod 91.

In the use of the windshield clearing system, assume that when inoperative, both pistons 42 and 46 (shown in dotted lines in FIG. 3) are positioned at the upper ends of their respective chambers and that the pump housing chamber 49 is charged with fluid from the reservoir 24. As the common piston 41 is at the upper extent of its travel, the closure member 99 is engaged with the coordinator pin 101 which acts to separate a pair of switch contacts 108 and 109 against the bias of a spring 112 (see FIG. 4) so that the wiper circuit is open. At the inlet valve 28 (FIG. 6), the suction line 31 from the intake manifold system is closed off from the line 32 leading to the control valve device 27, and the control valve 56 (FIG. 2) is free, both ports 61 and 63 (FIG. 3) being open to the atmosphere.

Referring now particularly to FIG. 3, to initiate operation of the coordinated wiper-washer system, the push button 29 is depressed by the operator until the closure member 84 engages the exposed end 86 to close the lower port 63. As the push button rod 81 is depressed, its pawl 79 engages a tooth 78 on the small ratchet wheel 77 and thus rotates the large ratchet wheel 71 one-eighth turn, there being eight teeth 78 on the wheel 77. This rotation aligns the opening 73a (see also FIG. 5) with the inlet and outlet couplings 69 and 68, respectively, and permits the application of suction pressure through the conduit 32 to the control valve housing bore 54. Thus, by closing off the lower port 63 from the atmosphere, and by the application of a subatmospheric pressure on the underside 111 (FIG. 3) of the upper control valve 57, and with the upper port 61 open, a pressure differential is applied across the upper land 57 of the control valve 56 to force the valve downwardly to the bottom of the bore 54, as best indicated in FIG. 3.

The control valve 56 (FIG. 3) is thus pneumatically positioned to open the cylinder housing chamber 35 above the piston 42 to the atmosphere through the port 61 and the passage 62; and to open the chamber 35 below the piston 42 to the suction pressure through the passage 64, between the valve shank 59 and the bore 54, and through the intermediate port 66. This pressure differential across the piston 42 forces the piston 42, and thus the rod 41 and the pump piston 46, from their uppermost positions in their chambers, as indicated in dotted lines in FIG. 3, to their lowermost positions, as indicated in full lines in FIG. 3.

As soon as the piston 42 begins to move downwardly, the pump piston 46 discharges fluid through the outlet coupling 52 to the nozzle 26, and simultaneously the piston extension closure member 99 moves out of engagement with the pin 101, whereupon the coordinator contacts 108 and 109 are engaged, due to the bias of the spring 112, to close the wiper motor circuit and to start the wiper motor 14. Thus, a momentary depression of the push button 29 results in simultaneous wiping and washing actions.

When the fluid is completely discharged from the pump housing 39, the pistons 42 and 46 (FIG. 3) are bottomed and the closure member 99 has been moved downwardly to a position covering the upper atmospheric port 61. Along with the downward movement of the piston 41, the spring valve 98 has been flexed from a position of concave curvature (FIG. 2) relative to the cylinder housing 38, to a position of convex curvature. This change of position by the spring valve 98 results in the end 97 thereof forcing the return rod 91 upwardly to a position so that its pawl 92 is poised above a tooth 93 of the large ratchet wheel 71, also having eight teeth. As the upper port 61 (FIG. 3) is now covered to shut off the upper end of the bore 54 from the atmosphere, and as the lower port 63 is open, due to the push button 29 having been only momentarily depressed, it is now seen that a subatmospheric pressure is applied to the inner side 113 of the control valve lower land 58, with atmospheric pressure being applied on the outer surface 114 thereof.

This pressure differential across the lower land 58 of the control valve 56 forces the valve upwardly to the position best illustrated in FIG. 4. Thus, the cylinder chamber 35 above the piston 42 is now in communication with the suction pressure through the passage 62, the space between the bore 54 and the valve shank 59, and the port 66; with the chamber 35 below the piston 42 being open to the atmosphere through the passage 64, the bore 54, and the port 63. The resulting pressure differential across the piston 42 causes the piston 42, the rod 41 and the pump piston 46 to be moved from their fully operated positions of FIG. 3 back to their fully inoperative positions (FIG. 4).

As the pump piston 46 is moved upwardly to the FIG. 4 position, fluid is withdrawn from the reservoir 24 through the conduit 23 and into the pump chamber 40 so that the pump is recharged and ready for the next washing-wiping cycle. At the end of the upward movement of the piston rod 41, during which movement the wiper motor 14 has continued to operate, the closure member 99 engages the coordinator pin 101 (FIG. 4) and effects a separation of the switch contacts 108 and 109 to open the wiper motor circuit. Thus, the operation of the wiper motor 14 is stopped a predetermined time after completion of the fluid delivery to the nozzle 26, depending on the interval of time for the movement of the piston 42 from its bottomed position (FIG. 3) to its upper position (FIG. 4).

Concurrent with the engagement of the closure member 99 with the pin 101, the spring valve 98 (FIG. 4) is snapped into its original concave position (see FIG. 2), whereupon the return rod 91 is forced downwardly through the inlet valve housing 67. This movement causes the pawl 92 to engage a tooth 93 of the large ratchet wheel 71 and rotate the wheel one-eighth rotation to move the opening 73a out of alignment, and a depression 74a into alignment with the couplings 69 and 68 (FIG. 6). Thus, the suction pressure source from the control valve 27 is closed off to effect a completion of the coordinated wiper-washer cycle of operation. In this position of FIG. 4, the structure disclosed therein is ready and cocked so to speak, for a subsequent actuation by a momentary depression of the push button to effect another wiper-washer cycle of operation.

Referring to FIG. 5, a pair of snub-nosed, arcuately spaced pins 116 and 117 are mounted in the inlet valve housing 67 for the respective engagement of each in either an opening 73 or a depression 74 in the ratchet wheel 71, depending on the rotative position of the wheel 71. These pins, biased by springs 118 interposed between the pins and threaded members 119 inserted into the housing 67, provide a releasable locking means relative to the ratchet wheel 71 to assure a positive alignment of either an opening 73 or a depression 74 with the inlet valve couplings 68 and 69.

The above described embodiment may be used with a conventional suction operated wiper motor (not shown) rather than with the electric wiper motor 14. Thus, the electric switch 16 for independent control of the wiper motor would be supplanted by the usual operator operated Bowden wire device connected to the suction motor control valve. Also, the coordinator 34 could comprise either an air valve for interconnection in the suction pressure line to the suction wiper motor, or it could comprise a mechanical device operatively connected to the suction wiper motor control valve. In either latter case, coordinated control of a suction wiper motor would be effected by operation of the remainder of the embodiment to obtain simultaneous wiper-washer action, and a time delayed wiper de-actuation subsequent to the washer de-actuation.

Although a preferred embodiment of this invention has been disclosed herein, various modifications can be made thereto without departing from the full and intended scope of the invention as defined in the appended claims.

I claim:

1. A windshield clearing system for a vehicle having a source of suction pressure comprising, a motor for oscillating a wiper across a windshield to be cleaned, a nozzle for directing a stream of washing fluid toward the windshield, means including a movable piston having a charge and discharge strobe to deliver fluid under pressure to the nozzle, fluid motor means operably connected to said piston and responsive to suction pressure to provide said piston with the charge and discharge stroke, valve means connected to the suction pressure source and open to the atmosphere and responsive to a pressure differential for controlling the suction pressure supplied to said fluid motor means, operator actuated means for controlling the application of a pressure differential to the valve means, and means responsive to the operation of said fluid motor means to start the wiper motor.

2. A windshield clearing system for a vehicle having a source of suction pressure comprising, a motor for oscillating a wiper across a windshield to be cleaned, a nozzle for directing a stream of washing fluid toward the windshield, means including a movable piston having a charge and discharge strobe to deliver fluid under pressure to the nozzle, fluid motor means operably connected to said piston and responsive to suction pressure to provide said piston with the charge and discharge stroke, valve means connected to the suction pressure source and open to the atmosphere and responsive to a pressure differential for controlling the operation of said fluid motor means, operator actuated means for controlling the application of a pressure differential to the valve means, and means responsive to the operation of said fluid motor means to start the wiper motor simultaneously with movement of said piston.

3. A windshield clearing system for a vehicle having a source of suction pressure comprising, a motor for oscillating a wiper across a windshield to be cleaned, a nozzle for directing a stream of washing fluid toward the windshield, means including a pump to deliver fluid under pressure to the nozzle, valve means including a housing in communication with the suction pressure source and open at two separate ports to the atmosphere, said valve means including a valve responsive to pressure differentials for controlling the operation of said fluid delivery means, operator actuated means operable to close one of said ports during the application of suction pressure to said valve means to control the application of a pressure differential to said valve, and means responsive to the operation of said fluid delivery means to start the motor and including a member operable to close the other of said ports to control the application of an opposite pressure differential to said valve.

4. A windshield clearing system for a vehicle having a source of suction pressure comprising, a motor for driving a wiper to and fro across the windshield to be cleaned, a nozzle for directing a stream of washing fluid toward the windshield, means including a pump for delivering fluid under pressure to said nozzle, means including a piston operably connected to said pump means and responsive to pressure differentials for movement from one position to another position to actuate said pump means, valve means connected to the suction pressure source and open to the atmosphere and responsive to pressure differentials for controlling the application of pressure differentials to said piston on both sides thereof, operator actuated means for controlling the application of pressure differentials to said valve means during the application of suction pressure thereto, and means operatively connected to said piston for starting said motor upon movement of said piston from said one position, and for stopping said motor after movement of said piston back to said one position.

5. A windshield clearing system for a vehicle having a source of suction pressure comprising, a motor for oscillating said wiper across a windshield, a nozzle for directing a stream of washing fluid toward the windshield, means for delivering a fluid under pressure to said nozzle including a housing enclosing a chamber having a piston therein, said housing having a pair of separate ports formed therein communicating the atmosphere with said chamber, said housing having a bore formed therein in communication with said ports and open through said housing to said suction pressure source, a valve mounted in said bore and movable between positions by opposed pressure differentials applied thereto for controlling the application through said ports of opposed pressure differentials to said piston, operator actuated control means for sequential closing and opening of said ports for controlling the application of said opposed pressure differentials to said valve during the application of suction pressure thereto, whereby to start the motor when delivery of said fluid is commenced and to stop the motor a predetermined time after fluid delivery is completed.

6. A windshield clearing system for a vehicle having a source of suction pressure comprising, a motor for oscillating said wiper across a windshield, a nozzle for directing a stream of washing fluid toward the windshield, means for delivering a fluid under pressure to said nozzle including a fluid motor having a housing enclosing a chamber with a piston reciprocally mounted therein, said means including pump means charged with fluid deliverable to said nozzle upon commencement of movement of said piston, valve means operatively associated with said fluid motor and in fluid communication with the atmosphere and said suction pressure source for pneumatically controlling the movement of said piston, first control means for setting the wiper motor in operation independently of said fluid delivering means, and second control means for setting the motor in operation upon commencement of movement of said piston and for stopping the wiper motor a predetermined time after fluid delivery is completed.

7. A windshield clearing system for a vehicle having a source of suction pressure comprising, a motor for oscillating a wiper across a windshield to be cleaned, a nozzle for directing a stream of washing fluid toward the windshield, means for delivering the fluid under pressure to the nozzle, pneumatically actuated valve means in communication with said suction pressure source for controlling the operation of said fluid delivery means, a coordinator interconnected between said motor and said fluid delivery means for starting said motor upon commencement of the delivery of fluid to said nozzle, and control means including an operator operated device operatively associated with said valve means for controlling the fluid delivery means during the application of suction pressure to said valve means and controlling the starting of said motor, said control means including a device fluid connectible with said valve means and operable by said fluid delivery means to stop said motor a predetermined time after fluid delivery is completed.

8. A windshield clearing system for a vehicle having a source of suction pressure comprising, a motor for oscillating a wiper across a windshield to be cleaned, a nozzle for directing a stream of washing fluid toward the windshield, means for delivering the fluid under pressure to the nozzle, pneumatically actuated valve means in communication with said suction pressure source for controlling the operation of said fluid delivery means, a coordinator interconnected between said motor and said fluid delivery means for starting said motor upon commencement of the delivery of fluid to said nozzle, a first control for starting and stopping said motor independent of said coordinator, and a second control including an operator operated device fluid connectible with said valve means for effecting the delivery of fluid and the starting of said motor during the application of suction pressure to said valve means, said control means including a device fluid connectible with said valve means and operable by said fluid delivery means to stop said motor a predetermined time after fluid delivery is completed.

References Cited in the file of this patent

UNITED STATES PATENTS

| | | |
|---|---|---|
| 2,688,514 | Oishei et al. | Sept. 7, 1954 |
| 2,877,485 | Oishei | Mar. 17, 1959 |
| 2,877,486 | Deibel et al. | Mar. 17, 1959 |
| 2,958,891 | Hart et al. | Nov. 8, 1960 |
| 3,014,231 | Ziegler | Dec. 26, 1961 |